US012792213B2

(12) United States Patent
Lee et al.

(10) Patent No.: US 12,792,213 B2
(45) Date of Patent: Nov. 10, 2026

(54) MULTI-TIER HEALTH STATUS IN A MEMORY DEVICE

(71) Applicant: Micron Technology, Inc., Boise, ID (US)

(72) Inventors: Sheng-Huang Lee, Meridian, ID (US); Lu Tong, Singapore (SG); Lawrence Celso Miranda, San Jose, CA (US); Lakshmi Kalpana Vakati, San Jose, CA (US); Ekamdeep Singh, San Jose, CA (US); Ashish Ghai, Saratoga, CA (US)

(73) Assignee: Micron Technology, Inc., Boise, ID (US)

(*) Notice: Subject to any disclaimer, the term of this patent is extended or adjusted under 35 U.S.C. 154(b) by 61 days.

(21) Appl. No.: 18/540,716

(22) Filed: Dec. 14, 2023

(65) Prior Publication Data

US 2024/0220110 A1 Jul. 4, 2024

Related U.S. Application Data

(60) Provisional application No. 63/435,792, filed on Dec. 28, 2022.

(51) Int. Cl.
*G06F 3/06* (2006.01)
*G06F 11/07* (2006.01)

(52) U.S. Cl.
CPC ............ *G06F 3/061* (2013.01); *G06F 3/0653* (2013.01); *G06F 3/0679* (2013.01); *G06F 11/073* (2013.01); *G06F 11/0754* (2013.01)

(58) Field of Classification Search
CPC . G11C 16/349; G11C 16/3418; G11C 29/028; G11C 13/0033; G06F 3/061; G06F 3/0653; G06F 3/0679; G06F 11/073; G06F 11/0754
See application file for complete search history.

(56) References Cited

U.S. PATENT DOCUMENTS

2007/0294588 A1* 12/2007 Coulson .............. G06F 11/1068 714/42
2018/0053559 A1* 2/2018 Kaneko .............. G11C 16/0483
2020/0411131 A1* 12/2020 Linnen ................... G11C 16/32
2021/0173734 A1* 6/2021 Lee ..................... G06F 11/0772
2022/0083408 A1* 3/2022 Singidi ............... G06F 11/0757
2022/0129185 A1* 4/2022 Boehm ................. G06F 3/0616
2022/0392516 A1* 12/2022 Cha .................... G11C 29/4401
(Continued)

FOREIGN PATENT DOCUMENTS

WO WO-2020257044 A1 * 12/2020 .......... G06F 11/1048

*Primary Examiner* — Curtis James Kortman
(74) *Attorney, Agent, or Firm* — Lowenstein Sandler LLP

(57) ABSTRACT

Control logic in a memory device identifies a segment of the plurality of segments of a memory array of a memory device, and determines a health status for the segment from a plurality of possible health statuses, the plurality of possible health statuses comprising three or more health statuses. The control logic further provides the health status for the segment to a memory sub-system controller associated with the memory device, wherein the memory sub-system controller is to perform a corresponding action with respect to the segment based on the health status, and wherein the corresponding action is different for each of the plurality of possible health statuses.

12 Claims, 7 Drawing Sheets

(56) References Cited

U.S. PATENT DOCUMENTS

| | | | | |
|---|---|---|---|---|
| 2023/0060943 | A1* | 3/2023 | Xu | G06F 3/0619 |
| 2023/0367680 | A1* | 11/2023 | Tong | G11C 11/5628 |
| 2025/0014657 | A1* | 1/2025 | Lien | G11C 16/349 |
| 2025/0110841 | A1* | 4/2025 | Tong | G06F 11/2023 |

* cited by examiner

MULTI-TIER HEALTH STATUS IN A MEMORY DEVICE

RELATED APPLICATIONS

This application claims the benefit of U.S. Provisional Patent Application No. 63/435,792, filed Dec. 28, 2022, which is incorporated herein by reference.

TECHNICAL FIELD

Embodiments of the disclosure relate generally to memory sub-systems, and more specifically, relate to multi-tier health status in a memory device of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
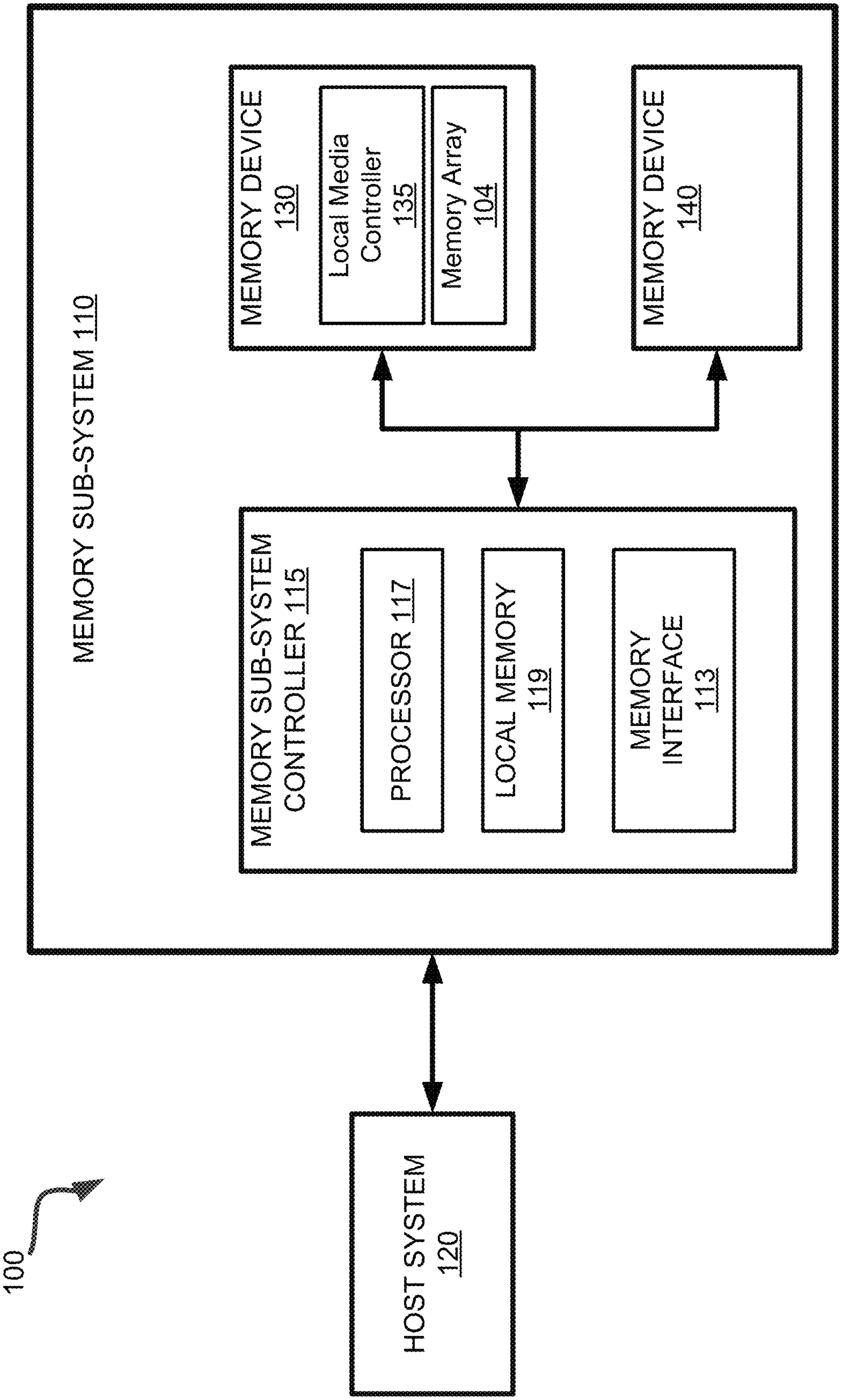
FIG. 1A illustrates an example computing system that includes a memory sub-system in accordance with some embodiments of the present disclosure.

Aspects of the present disclosure are directed to multi-tier health status in a memory device of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

One example of a memory sub-system is a solid-state drive (SSD) that includes one or more non-volatile memory devices and a memory sub-system controller to manage the non-volatile memory devices. A given segment of one of those memory devices (e.g., a block) can be characterized based on the programming state of the memory cells associated with wordlines contained within the segment. When data is written to a memory cell of the segment for storage, the memory cell can deteriorate. Accordingly, each memory cell of the segment can handle a finite number of write operations performed before the memory cell is no longer able to reliably store data. Data stored at the memory cells of the segment can be read from the memory device and transmitted to a host system.

Certain memory devices can use one or more internal performance metrics to characterize individual segments of the memory device and can determine, based on that characterization, a corresponding status of each segment. The memory devices can provide an indication of this status to the memory sub-system controller, for example in connection with performing a memory access operation in response to a request or command received from the memory sub-system controller. In response to receiving such status information, the memory sub-system controller perform certain predetermined actions or can modify the way it uses the specific segment of the memory device based on the corresponding status. Many memory devices, however, provide only a binary status information representing one of two possible states (e.g., healthy/damaged, pass/fail). Such binary status information, while helpful for the memory sub-system controller in some respects, may not provide a full representation of the true status of the memory device. For example, the binary status provided by the memory device may indicate that a given segment has passed a health check based on current metrics. Accordingly, the memory sub-system controller may believe that segment is perfectly healthy and continue normal use of that segment. In reality, however, that segment may have only just barely passed the health check and may be extremely likely to fail in the near future. If the memory sub-system controller were aware of this condition, it may decide to use the segment differently that it otherwise would have, and/or may take other action to repair/restore the segment to extend its usability. Such nuance, however, cannot be adequately represented in the binary status information, which can hurt performance in the memory sub-system. This can result in a higher failure rate for segments of the memory device. This can increase the use of an error detection and correction operation (e.g., an error control operation) for subsequent operations (e.g., read and/or write operations) performed on the memory device. In addition, as the error rate for a memory cell or failure rate of a segment (e.g., a block) continues to increase, it may even surpass the error correction capabilities of the memory sub-system, leading to an irreparable loss of the data. Furthermore, as more resources of the memory sub-system are used to perform the error control operation, fewer resources can be used to perform other read operations or write operations.

Aspects of the present disclosure address the above and other deficiencies by implementing a multi-tier health status in a memory device of a memory sub-system. In one embodiment, control logic on the memory device (e.g., a local media controller) determines one of a plurality of possible health statuses for a given segment (e.g., a block) of the memory device, and provides the determined health status to a requestor, such as a memory sub-system controller performing memory access operations on the memory device. To determine the health status, the control logic can utilize various internal health metrics and compare the value of one or more of those health metrics to corresponding thresholds associated with each of the possible health statuses. The possible health statuses for each segment can include a high confidence pass status, a high confidence fail status, and at least one intermediate status, such as a marginal pass status and/or a marginal fail status. The high confidence pass status and the high confidence fail status provide strong indication of the relative health of the segment and indicate, respectively, that either the segment can continue to be used safely or that the segment should be retired and no longer used. The intermediate statuses, however, provide more nuanced information. For example, the marginal pass status can indicate that while the segment passed a health check and can continue to be used with sufficient confidence, the segment may be trending towards failure sometime in the near future, and so the memory sub-system controller may want to monitor the health status and perform additional checks (e.g., health scan operations) going forward. The marginal fail status, for example, can indicate that while the segment failed a health check, it only barely did so, and may be recoverable if the memory sub-system controller can perform some repair/refresh operations on the segment to allow it to continue to be used. Accordingly, upon receiving this health status information, the memory sub-system controller can perform a corresponding action with respect to the segment based on the health status, as described in more detail below. The corresponding action taken can be different for each of the possible health statuses.

Advantages of this approach include, but are not limited to, improved performance in the memory sub-system. By providing multi-tiered health status information for the memory device, the techniques described herein can reduce the risk of data loss by preemptively identifying degraded segments of the memory device and providing the memory sub-system controller an opportunity to address them in advance. Since the memory device can determine the health status independently using internal information, it reduces the impact on the bandwidth of the memory sub-system controller that would normally be allocated to tracking the memory device health status. In addition, the just-in-time fault detection and isolation that is enabled can alleviate the burden on system redundancy (e.g., RAIN), thereby reducing system cost (e.g., by reducing the size of necessary system memory) and improving quality of service provided to host systems.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, “coupled to” or “coupled with” generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device 130 having control logic (e.g., local controller 135) on the die and a controller (e.g., memory sub-system controller 115) for media management within the same memory device package. An example of a managed memory device is a managed NAND (MNAND) device. Memory device 130, for example, can represent a single die having some control logic (e.g., local media controller 135) embodied thereon. In some embodiments, one or more components of memory sub-system 110 can be omitted.

In one embodiment, memory sub-system 110 includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command, a confirmation that a program command was successfully performed, or an indication of a multi-tiered health status information corresponding to one or more segments of the memory device 130. In some embodiments, the memory sub-system controller 115 includes at least a portion of the memory interface 113. For example, the memory sub-system controller 115 can include a processor 117 (e.g., a processing device) configured to execute instructions stored in local memory 119 for performing the operations described herein. In some embodiments, the memory interface component 113 is part of the host system 110, an application, or an operating system.

In one embodiment, memory device 130 includes local media controller 135 and memory array 104. As described herein, the memory array 104 can be logically or physically divided into a number of segments (e.g., dies, blocks, pages, etc.). In one embodiment, local media controller 135 determines one of a plurality of possible health statuses for a given segment of the memory array 104, and provides the determined health status to a requestor, such as memory interface 113 or other component of memory sub-system controller 115. To determine the health status, local media controller 135 can utilize various internal health metrics and compare the value of one or more of those health metrics to corresponding thresholds associated with each of the possible health statuses. The possible health statuses for each segment can include a high confidence pass status, a high confidence fail status, and at least one intermediate status, such as a marginal pass status and/or a marginal fail status. Upon receiving this health status information, memory sub-system controller 115 can perform a corresponding action with respect to the segment based on the health status, where the corresponding action taken can be different for each of the possible health statuses. Further details with regards to the design and operation of memory sub-system controller 115 and local media controller 135 are described below.

Figure 1B:
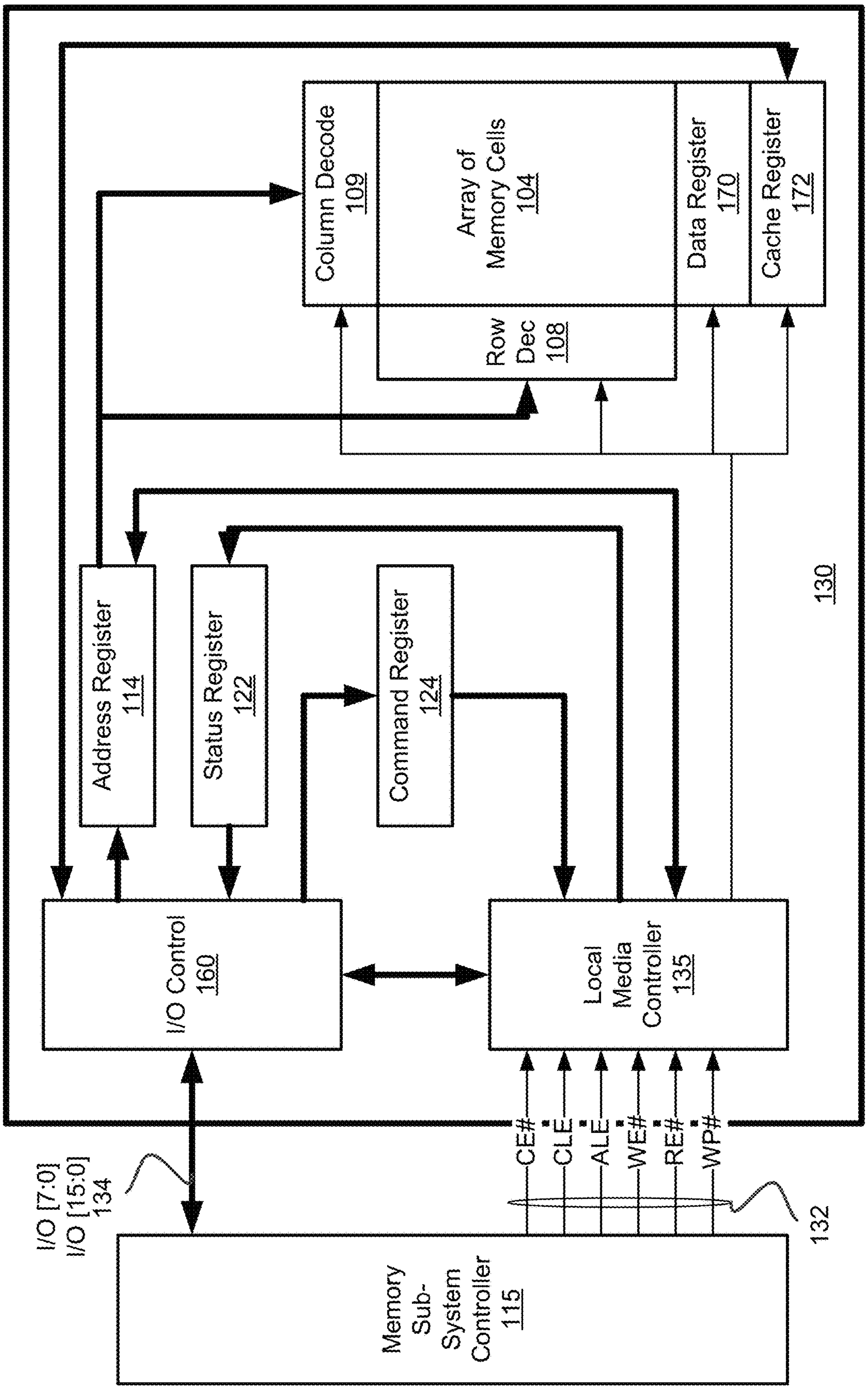
FIG. 1B is a block diagram of a memory device in communication with a memory sub-system controller of a memory sub-system, in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 236 and outputs data to the memory sub-system controller 115 over I/O bus 236.

For example, the commands may be received over input/output (I/O) pins [7:0] of I/O bus 236 at I/O control circuitry 160 and may then be written into command register 124. The addresses may be received over input/output (I/O) pins [7:0] of I/O bus 236 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2:
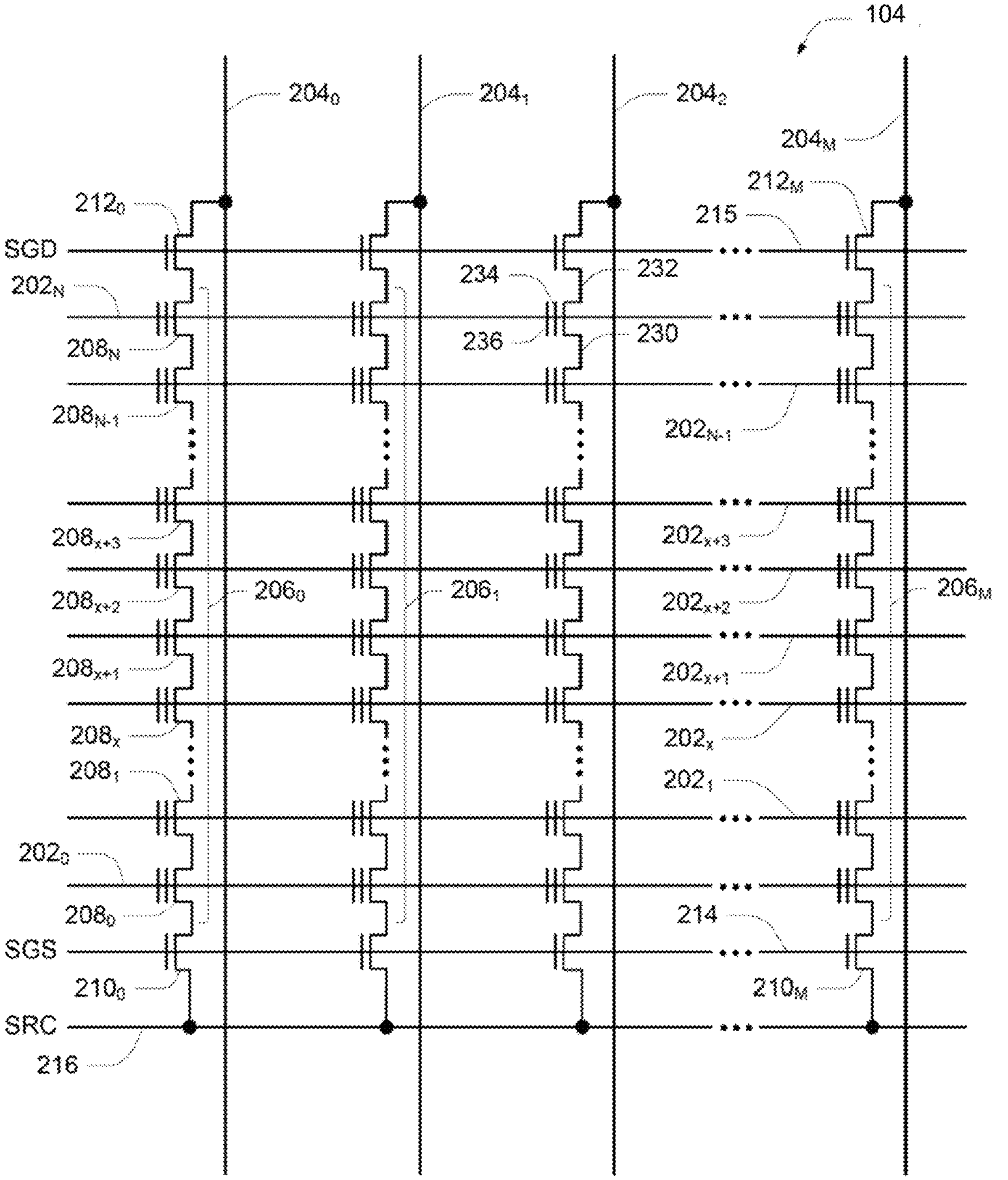
FIG. 2 is a schematic of portions of an array of memory cells as could be used in a memory of the type described with reference to FIG. 1B in accordance with some embodiments of the present disclosure.

FIG. 2 is a schematic of portions of an array of memory cells 104, such as a NAND memory array, as could be used in a memory of the type described with reference to FIG. 1B according to an embodiment. Memory array 104 includes access lines, such as wordlines $\mathbf{202}_0$ to $\mathbf{202}_N$, and data lines, such as bit lines $\mathbf{204}_0$ to $\mathbf{204}_M$. The wordlines 202 can be connected to global access lines (e.g., global wordlines), not shown in FIG. 2, in a many-to-one relationship. For some embodiments, memory array 104 can be formed over a semiconductor that, for example, can be conductively doped to have a conductivity type, such as a p-type conductivity, e.g., to form a p-well, or an n-type conductivity, e.g., to form an n-well.

Memory array 104 can be arranged in rows (each corresponding to a wordline 202) and columns (each corresponding to a bit line 204). Each column can include a string of series-connected memory cells (e.g., non-volatile memory cells), such as one of NAND strings $\mathbf{206}_0$ to $\mathbf{206}_M$. Each NAND string 206 can be connected (e.g., selectively connected) to a common source (SRC) 216 and can include memory cells $\mathbf{208}_0$ to $\mathbf{208}_N$. The memory cells 208 can represent non-volatile memory cells for storage of data. The memory cells 208 of each NAND string 206 can be connected in series between a select gate 210 (e.g., a field-effect transistor), such as one of the select gates $\mathbf{210}_0$ to $\mathbf{210}_M$ (e.g., that can be source select transistors, commonly referred to as select gate source), and a select gate 212 (e.g., a field-effect transistor), such as one of the select gates $\mathbf{212}_0$ to $\mathbf{212}_M$ (e.g., that can be drain select transistors, commonly referred to as select gate drain). Select gates $\mathbf{210}_0$ to $\mathbf{210}_M$ can be commonly connected to a select line 214, such as a source select line (SGS), and select gates $\mathbf{212}_0$ to $\mathbf{212}_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $\mathbf{208}_0$ of the corresponding NAND string 206. For example, the drain of select gate $\mathbf{210}_0$ can be connected to memory cell $\mathbf{208}_0$ of the corresponding NAND string $\mathbf{206}_0$. Therefore, each select gate 210 can be configured to selectively connect a corresponding NAND string 206 to the common source 216. A control gate of each select gate 210 can be connected to the select line 214.

The drain of each select gate 212 can be connected to the bit line 204 for the corresponding NAND string 206. For example, the drain of select gate $\mathbf{212}_0$ can be connected to the bit line $\mathbf{204}_0$ for the corresponding NAND string $\mathbf{206}_0$. The source of each select gate 212 can be connected to a memory cell $\mathbf{208}_N$ of the corresponding NAND string 206. For example, the source of select gate $\mathbf{212}_0$ can be connected to memory cell $\mathbf{208}_N$ of the corresponding NAND string $\mathbf{206}_0$. Therefore, each select gate 212 can be configured to selectively connect a corresponding NAND string 206 to the corresponding bit line 204. A control gate of each select gate 212 can be connected to select line 215.

The memory array 104 in FIG. 2 can be a quasi-two-dimensional memory array and can have a generally planar structure, e.g., where the common source 216, NAND strings 206 and bit lines 204 extend in substantially parallel planes. Alternatively, the memory array 104 in FIG. 2 can be a three-dimensional memory array, e.g., where NAND strings 206 can extend substantially perpendicular to a plane containing the common source 216 and to a plane containing the bit lines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bit line 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $\mathbf{202}_N$ and selectively connected to even bit lines 204 (e.g., bit lines $\mathbf{204}_0$, $\mathbf{204}_2$, $\mathbf{204}_4$, etc.) can be one physical page of the memory cells 208 (e.g., even memory cells) while memory cells 208 commonly connected to wordline $\mathbf{202}_N$ and selectively connected to odd bit lines 204 (e.g., bit lines $\mathbf{204}_1$, $\mathbf{204}_3$, $\mathbf{204}_5$, etc.) can be another physical page of the memory cells 208 (e.g., odd memory cells).

Although bit lines $\mathbf{204}_3$-$\mathbf{204}_5$ are not explicitly depicted in FIG. 2, it is apparent from the figure that the bit lines 204 of the array of memory cells 104 can be numbered consecutively from bit line $\mathbf{204}_0$ to bit line $\mathbf{204}_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $\mathbf{202}_0$-$\mathbf{202}_N$ (e.g., all NAND strings 206 sharing common wordlines 202). Unless expressly distinguished, a reference to a page of memory cells herein refers to the memory cells of a logical page of memory cells. Although the example of FIG. 2 is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

Figure 3:
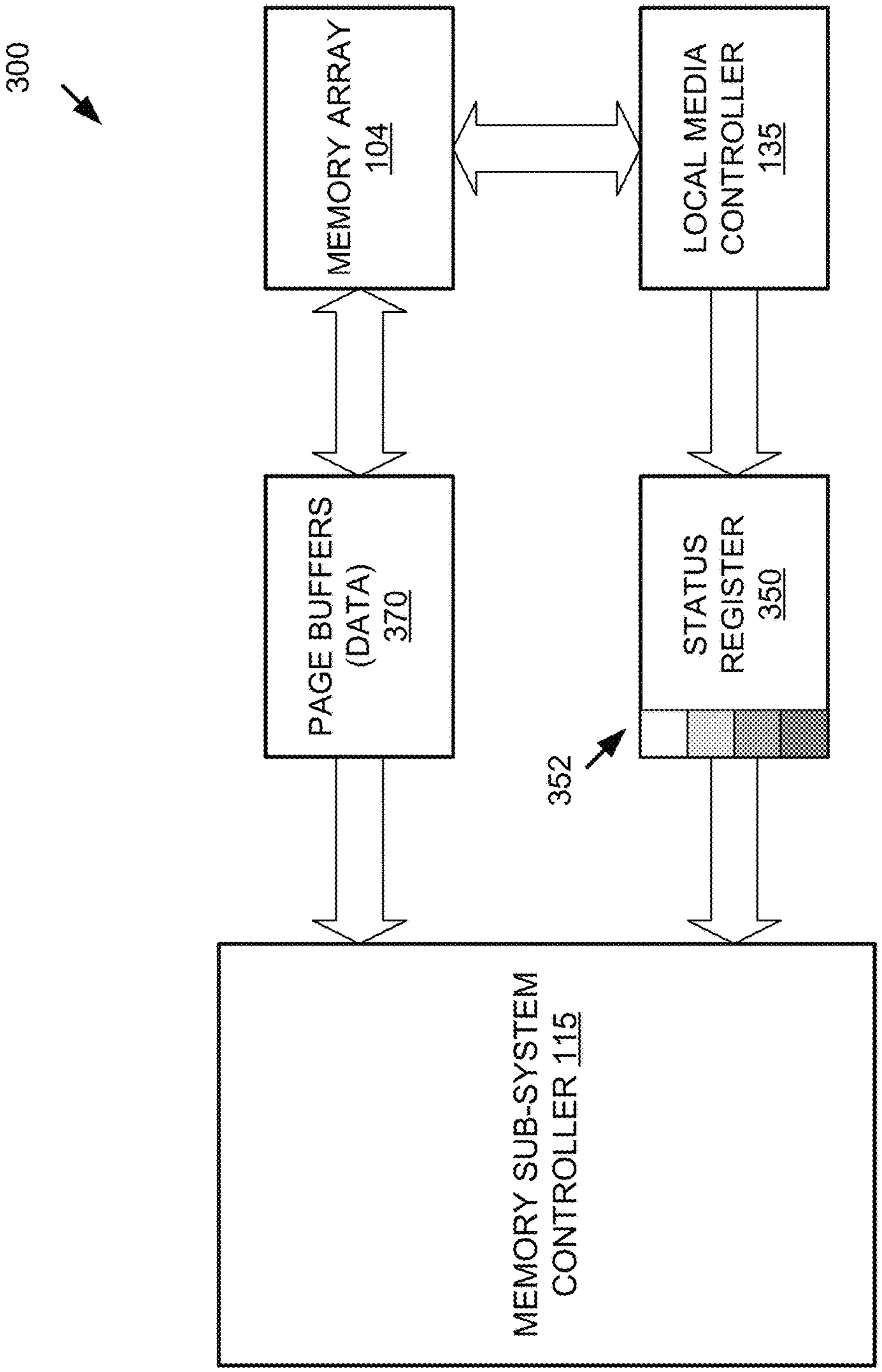
FIG. 3 is a block diagram illustrating implementation of multi-tier health status information in a memory sub-system in accordance with some embodiments of the present disclosure.

FIG. 3 is a block diagram illustrating implementation of multi-tier health status information in a memory sub-system in accordance with some embodiments of the present disclosure. The diagram 300 illustrates some example data communication between memory sub-system controller 115 and various components of a memory device, such as memory device 130, including memory array 104, local media controller 135, a status register 350, and page buffers 370. In one embodiment, the memory sub-system controller 115 sends a request to perform a memory access operation on a segment of the memory array 104. For purposes of explanation, this can include a request to perform a read operation on the segment of memory array 104. In other embodiments, however, the request can be associated with some other memory access operation, such as a program operation, an erase operation, etc. In response to receiving the request, local media controller 135 can perform the memory access operation (i.e., the read operation) and the requested data read from memory array 104 can be temporarily stored in page buffers 370 (e.g., in one of data register 170 or cache register 172).

In addition, local media controller 135 can determine one of a plurality of possible health statuses for the segment of memory array 104 and store a value corresponding to the determined health status in a status register 350. As illustrated in FIG. 3, there can be a number of possible health statuses 352, such as a high confidence pass status, a high confidence fail status, and at least one intermediate status, such as a marginal pass status and/or a marginal fail status. In one embodiment, status register 350 includes a number of bits, each of which can be set to a corresponding state (i.e., 0 or 1) to represent the status of any number of different parameters associated with the memory device as a whole or with one or more segments of the memory device. In on embodiment, two or more bits of the status register 350 can be designated to represent to the health status of a given segment of memory array 104. In the illustrated embodiment, there are four possible health statuses 352, which can be represented by two bits in status register 350 (i.e., $2^2=4$). In other embodiments, however, there can be some other number of possible health statuses (e.g., three or more health statuses), which can be represented by some other number of bits in status register 350.

In one embodiment, in order to determine the health status for a given segment of memory array 104, local media controller 135 can determine a value of one or more health metric of the segment and compare that value to a set of thresholds associated with the possible health statuses 352. Any number of different health metrics can be used, however, some examples include a charge pump clock monitor (CPCM), lagging plane pulse count (LPC), erase CPCM, quick plane termination (QPT), or wordline short sensor (WLSS). In one embodiment, each of the possible health statuses has a corresponding threshold related to the different health metrics. For purposes of explanation, the high confidence pass status could have a threshold set at $1.0\times N$, where N is a normal expected value (e.g., under healthy operating conditions) for any of the health metrics described above. Thus, upon detecting any value of the health metric equal to or less than N, the local media controller 135 can determine the high confidence pass status. Continuing with the example, the marginal pass status can have a threshold set at $1.5\times N$, such that upon detecting any value of the health metric greater than N and equal to or less than $1.5\times N$, the local media controller 135 can determine the marginal pass status. In addition, the marginal fail status can have a threshold set at $2.0\times N$, such that upon detecting any value of the health metric greater than $1.5\times N$ and equal to or less than $2.0\times N$, the local media controller 135 can determine the marginal fail status. Furthermore, the high confidence fail status can have a threshold set at $2.5\times N$, such that upon detecting any value of the health metric greater than $2.0\times N$ and equal to or less than $2.5\times N$, the local media controller 135 can determine the high confidence fail status. Depending on the embodiment and on the specific health metric used, these thresholds can vary. For example, for some health metrics, a higher value may be preferrable, such that the threshold values for the fail statuses are lower than the threshold values for the pass statuses.

In one embodiment, in response to the request to perform the memory access operation, the memory device, such as memory device 130, provides the requested data from the page buffers 370 and the health status information from status register 350 to the memory sub-system controller 115.

In response to receiving the health status information, the memory sub-system controller can perform a corresponding action with respect to the received data and with respect to the segment of memory array 104 from which that data was received based on the health status. In one embodiment, that corresponding action is different for each of the possible health statuses 352. For example, in response to receiving the high confidence pass status, memory sub-system controller 115 can fully trust the data received from page buffers 370 and can continue using the segment of memory array 104 normally without any corrective action. The marginal pass status can indicate that while the segment passed a health check and can continue to be used with sufficient confidence, the segment may be trending towards failure sometime in the near future, and so the memory sub-system controller 115 can monitor the health status and perform additional checks (e.g., health scan operations) on the segment going forward. The marginal fail status, for example, can indicate that while the segment failed a health check, it only barely did so, and may be recoverable if the memory sub-system controller 115 can perform some repair/refresh operations on the segment to allow it to continue to be used. In response to receiving the high confidence fail status, memory sub-system controller 115 can determine that the data received from page buffers 370 is unusable, can trigger a data recovery operation and can retire the segment of memory array 104 so that it is not used again in the future.

Figure 4:
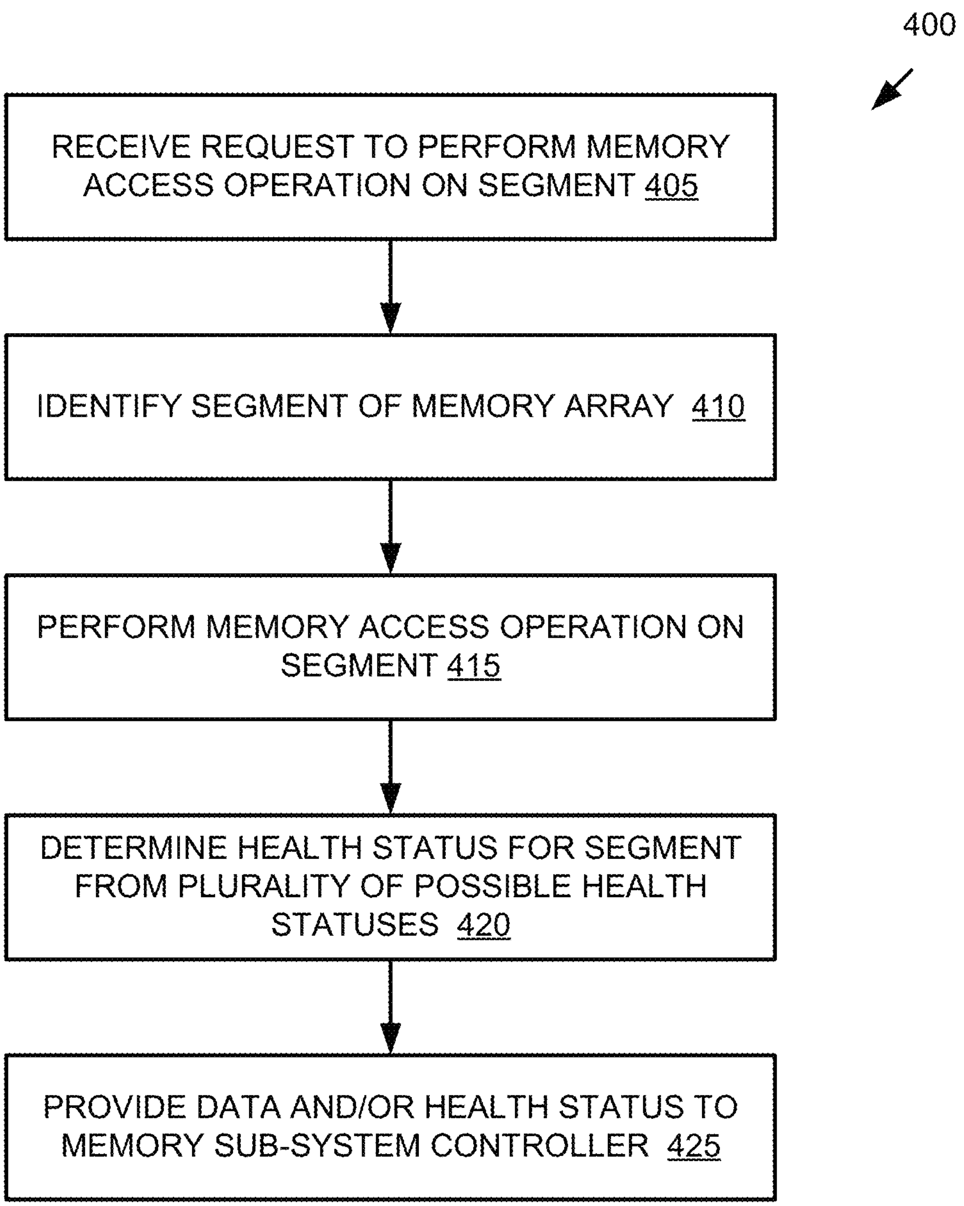
FIG. 4 is a flow diagram of an example method of determining a multi-tier health status in a memory device of a memory sub-system in accordance with some embodiments of the present disclosure.

FIG. 4 is a flow diagram of an example method of determining a multi-tier health status in a memory device of a memory sub-system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by local media controller 135 of FIG. 1A, FIG. 1B, and FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, a request is received. For example, control logic (e.g., local media controller 135) can receive, from a requestor, such as memory interface 113 of memory sub-system controller 115, a request to perform a memory access operation on a segment (e.g., a block) of a memory array, such as memory array 104 of memory device 130. In one embodiment, the request includes a request to perform a read operation to read data from a certain segment. In other embodiments, the request can be for some other memory access operation, such as a program operation or an erase operation.

At operation 410, a segment is identified. For example, the control logic can identify the segment from among a plurality of segments of the memory array. In one embodiment, as indicated above, the request includes an identifier or other indication of the segment. In other embodiments, such as when no request is received, the control logic can separately identify the segment in some other manner (e.g., randomly, pseudo-randomly, sequentially).

At operation 415, a memory access operation is performed. For example, the control logic can perform the memory access operation, such as a read operation, on the segment identified in the request. In one embodiment, the control logic causes a read voltage to be applied to one or more wordlines associated with the segment of memory array 104 and determines a corresponding signal on one or more bitlines associated with the segment, where the signal on the bitlines represents the data stored in one or more memory cells of the segment. In one embodiment, the control logic temporarily stores the data in one or more of page buffers 370 of the memory device 130.

At operation 420, a health status is determined. For example, the control logic can determine a health status for the segment from among a number of possible health statuses (e.g., three or more possible health statues). These possible health statuses can include, for example, a high confidence pass status, a high confidence fail status, and at least one intermediate status, such as a marginal pass status and/or a marginal fail status. In one embodiment, in order to determine the health status for a given segment of memory array 104, the control logic can determine a value of one or more health metric of the segment and compare that value to a set of thresholds associated with the possible health statuses. Any number of different health metrics can be used, however, some examples include a charge pump clock monitor (CPCM), lagging plane pulse count (LPC), erase CPCM, quick plane termination (QPT), or wordline short sensor (WLSS). In one embodiment, each of the possible health statuses has a corresponding threshold related to the different health metrics.

At operation 425, information is provided to the requestor. For example, the control logic can provide the data read in response to receiving the request to perform the memory access operation, along with the health status for the segment to the requestor, such as memory sub-system controller 115. In one embodiment, the memory sub-system controller 115 is to perform a corresponding action with respect to the segment based on the health status, and this corresponding action is different for each of the possible health statuses. Additional details with respect to the actions performed by memory sub-system controller 115 are provided below with respect to FIG. 5.

Figure 5:
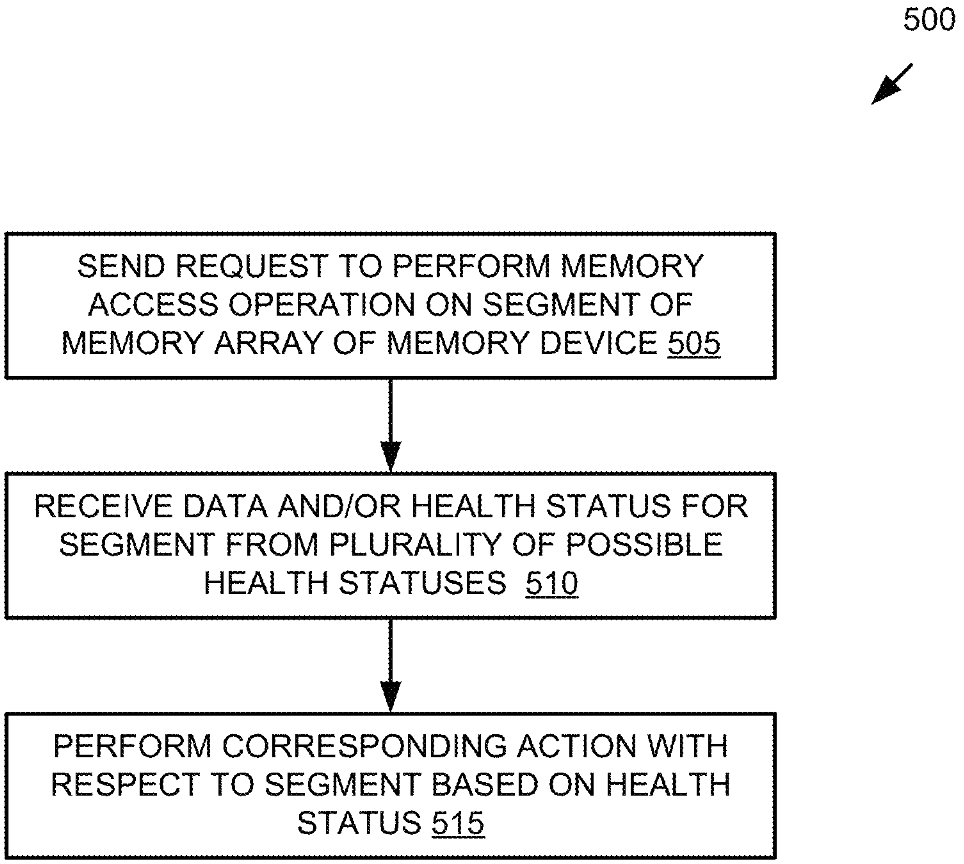
FIG. 5 is a flow diagram of an example method of utilizing a multi-tier health status for a memory device in a memory sub-system in accordance with some embodiments of the present disclosure.

FIG. 5 is a flow diagram of an example method of utilizing a multi-tier health status for a memory device in a memory sub-system in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by memory sub-system controller 115 of FIG. 1A, FIG. 1B, and FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, a request is sent. For example, processing logic (e.g., memory sub-system controller 115) can send a request to perform a memory access operation on a segment of a memory array, such as memory array 104 of memory device 130. In one embodiment, the request includes a request to perform a read operation to read data from a certain segment. In other embodiments, the request can be for some other memory access operation, such as a program operation or an erase operation.

At operation 510, information is received. For example, the processing logic can receive, in response to the request, the requested data read from the segment of the memory array 104, and a health status for the segment from among a number of possible health statuses (e.g., three or more possible health statues). These possible health statuses can include, for example, a high confidence pass status, a high confidence fail status, and at least one intermediate status, such as a marginal pass status and/or a marginal fail status. In one embodiment, the health status for the segment can be determined as described above with respect to FIG. 4.

At operation 515, one or more actions are performed. For example, the processing logic can perform a corresponding action with respect to the segment based on the health status, where the corresponding action is different for each of the possible health statuses. For example, in response to receiving the high confidence pass status, the processing logic can fully trust the data received from page buffers 370 and can continue using the segment of memory array 104 normally without any corrective action. In response to receiving the high confidence fail status, processing logic can determine that the data received from page buffers 370 is unusable, can trigger a data recovery operation and can retire the segment of memory array 104 so that it is not used again in the future.

In one embodiment, the processing logic can perform different operations in response to receiving an indication that the segment has the marginal pass status or the marginal fail status. The marginal pass status can indicate that while the segment passed a health check and can continue to be used with sufficient confidence, the segment may be trending towards failure sometime in the near future, and so the processing logic can monitor the health status and perform additional checks (e.g., health scan operations) on the segment going forward. In one embodiment, the processing logic can quarantine the segment. In order to quarantine the segment, the processing logic can add an indication of the segment to a queue, for example, of segments for which additional monitoring is advisable. In one embodiment, the segments in the queue are not used until a health scan operation can be performed. At some point in the future, such as during an idle time when the processing logic has available bandwidth (i.e., a time when the processing logic is not busy performing host requested memory access operations), the processing logic can perform the health scan to recheck the segment. In one embodiment, the processing logic can sequentially apply a number of different read voltage offsets to see if there is significant sensitivity in a health metric, such as an error rate. In addition, the processing logic can re-read the data from the segment (e.g., using a default or any of the available read voltage offsets) and confirm that the data can pass an error correction operation.

The marginal fail status can indicate that while the segment failed a health check, it only barely did so, and may be recoverable if the processing logic can perform some repair/refresh operations on the segment to allow it to continue to be used. Responsive to receiving such a marginal fail status for the segment, the processing logic can perform a data recovery operation to salvage the segment of the memory array. In one embodiment, the processing logic can re-read the data from the segment (e.g., using the same or a different read voltage offset), re-check the error rate and confirm whether the segment passes or fails the health check. In another embodiment, the processing logic can perform a salvage operation, including moving the data from the segment to another segment in memory device 130, erasing the original segment, re-programming the original segment with some other data, and then performing a health scan on the original segment. If after the salvage operation, the segment passes the health check, the segment can be returned to a pool of usable segments.

Figure 6:
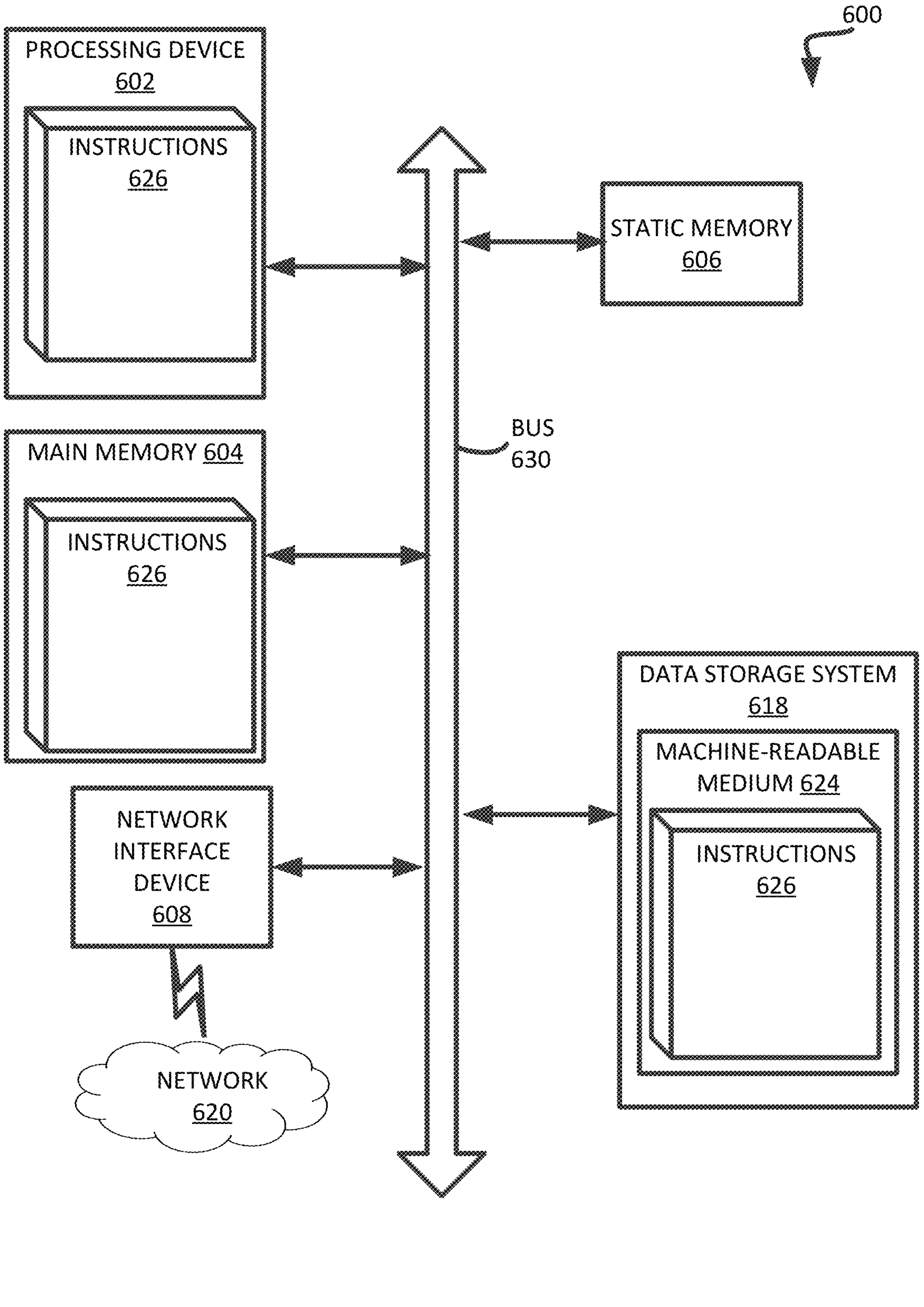
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the local media controller 135 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1A.

In one embodiment, the instructions 626 include instructions to implement functionality corresponding to the local media controller 135 of FIG. 1A). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:

a memory array comprising a plurality of segments; and control logic, operatively coupled with the memory array, to perform operations comprising:

receiving, from a memory sub-system controller associated with the memory device, a request to perform a memory access operation on a segment of the plurality of segments of the memory array;

performing the memory access operation on the segment of the memory array;

determining a health status for the segment from a plurality of possible health statuses, the plurality of possible health statuses comprising three or more health statuses, wherein determining the health status for the segment comprises determining a value of a health metric of the segment and comparing the value of the health metric to a set of thresholds associated with the plurality of possible health statuses, wherein the health metric is selected from at least one of a charge pump clock monitor (CPCM) metric, a lagging plane pulse count (LPC) metric, an erase CPCM metric, or a wordline short sensor (WLSS) metric, wherein the plurality of possible health statuses comprises a pass status indicating that the value of the health metric meets an expected value, a fail status indicating that the value of the health metric exceeds a maximum allowable value, and at least one intermediate status, wherein the pass status indicates that the segment can continue to be used, and wherein the fail status indicates that the segment should be retired and no longer used; and providing the health status for the segment to the memory sub-system controller in response to receiving the request to perform the memory access operation, wherein the memory sub-system controller is to perform a corresponding action with respect to the segment based on the health status, and wherein the corresponding action is determined based on which of the plurality of possible health statuses is determined for the segment, such that a different action is performed for each of the plurality of possible health statuses.

2. The memory device of claim 1, wherein the at least one intermediate status comprises at least one of an intermediate pass status or an intermediate fail status, wherein the intermediate pass status indicates the segment passed health checks but may be trending towards failure, and wherein the intermediate fail status indicates the segment failed but may be recoverable.

3. The memory device of claim 2, wherein responsive to providing the intermediate pass status for the segment to the memory sub-system controller, the memory sub-system controller is to schedule a health scan to be performed on the segment of the memory array.

4. The memory device of claim 2, wherein responsive to providing the intermediate fail status for the segment to the memory sub-system controller, the memory sub-system controller is to perform a data recovery operation to salvage the segment of the memory array.

5. A method comprising:

receiving, from a memory sub-system controller associated with a memory device, a request to perform a memory access operation on a segment of a plurality of segments of a memory array of the memory device;

performing the memory access operation on the segment of the memory array;

determining a health status for the segment from a plurality of possible health statuses, the plurality of possible health statuses comprising three or more health statuses, wherein determining the health status for the segment comprises determining a value of a health metric of the segment and comparing the value of the health metric to a set of thresholds associated with the plurality of possible health statuses, wherein the health metric is selected from at least one of a charge pump clock monitor (CPCM) metric, a lagging plane pulse count (LPC) metric, an erase CPCM metric, or a wordline short sensor (WLSS) metric, wherein the plurality of possible health statuses comprises a pass status indicating that the value of the health metric meets an expected value, a fail status indicating that the value of the health metric exceeds a maximum allowable value, and at least one intermediate status, wherein the pass status indicates that the segment can continue to be used, and wherein the fail status indicates that the segment should be retired and no longer used; and providing the health status for the segment to the memory sub-system controller in response to receiving the request to perform the memory access operation, wherein the memory sub-system controller is to perform a corresponding action with respect to the segment based on the health status, and wherein the corresponding action is determined based on which of the plurality of possible health statuses is determined for the segment, such that a different action is performed for each of the plurality of possible health statuses.

6. The method of claim 5, wherein the at least one intermediate status comprises at least one of an intermediate pass status or an intermediate fail status, wherein the intermediate pass status indicates the segment passed health checks but may be trending towards failure, and wherein the intermediate fail status indicates the segment failed but may be recoverable.

7. The method of claim 6, wherein responsive to providing the intermediate pass status for the segment to the memory sub-system controller, the memory sub-system controller is to schedule a health scan to be performed on the segment of the memory array.

8. The method of claim 6, wherein responsive to providing the intermediate fail status for the segment to the memory sub-system controller, the memory sub-system controller is to perform a data recovery operation to salvage the segment of the memory array.

9. A system comprising:

a memory device; and a processing device, operatively coupled with the memory device, to perform operations comprising:

sending a request to perform a memory access operation on a segment of a memory array of the memory device;

receiving, in response to sending the request and the memory device performing the memory access operation, a health status, of a plurality of possible health statuses, for the segment, the plurality of possible health statuses comprising three or more health statuses, wherein the plurality of possible health statuses comprises a pass status indicating that a value of a health metric meets an expected value, a fail status indicating that the value of the health metric exceeds a maximum allowable value, and at least one intermediate status, wherein the pass status indicates that the segment can continue to be used, wherein the fail status indicates that the segment should be retired and no longer used, and wherein the health metric is selected from at least one of a charge pump clock monitor (CPCM) metric, a lagging plane pulse count (LPC) metric, an erase CPCM metric, or a wordline short sensor (WLSS) metric; and performing a corresponding action with respect to the segment based on the health status, wherein the corresponding action is determined based on which of the plurality of possible health statuses is determined for the segment, such that a different action is performed for each of the plurality of possible health statuses.

10. The system of claim 9, wherein the at least one intermediate status comprises at least one of an intermediate pass status or an intermediate fail status, wherein the intermediate pass status indicates the segment passed health checks but may be trending towards failure, and wherein the intermediate fail status indicates the segment failed but may be recoverable.

11. The system of claim 10, wherein responsive to receiving the intermediate pass status for the segment, the processing device is to schedule a health scan to be performed on the segment of the memory array.

12. The system of claim 10, wherein responsive to receiving the intermediate fail status for the segment, the processing device is to perform a data recovery operation to salvage the segment of the memory array.

* * * * *